US012221094B2

(12) United States Patent
Park

(10) Patent No.: US 12,221,094 B2
(45) Date of Patent: Feb. 11, 2025

(54) TORQUE VECTORING CONTROL DEVICE AND METHOD THEREFOR

(71) Applicants: Hyundai Motor Company, Seoul (KR); Kia Corporation, Seoul (KR)

(72) Inventor: Jae Il Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 332 days.

(21) Appl. No.: 17/862,706

(22) Filed: Jul. 12, 2022

(65) Prior Publication Data

US 2023/0286494 A1    Sep. 14, 2023

(30) Foreign Application Priority Data

Mar. 10, 2022   (KR) ........................ 10-2022-0030191

(51) Int. Cl.
*B60W 30/045*    (2012.01)
*B60W 10/08*    (2006.01)
*B60W 30/18*    (2012.01)

(52) U.S. Cl.
CPC .......... *B60W 30/045* (2013.01); *B60W 10/08* (2013.01); *B60W 30/18145* (2013.01); *B60W 30/18172* (2013.01); *B60W 2510/083* (2013.01); *B60W 2520/14* (2013.01); *B60W 2520/26* (2013.01); *B60W 2520/266* (2013.01); *B60W 2540/10* (2013.01); *B60W 2540/12* (2013.01); *B60W 2540/18* (2013.01); *B60W 2710/083* (2013.01); *B60W 2720/14* (2013.01)

(58) Field of Classification Search
CPC ......... B60W 30/045; B60W 30/18145; B60W 30/18172; B60W 10/08; B60W 10/20; B60W 2510/083; B60W 2520/14; B60W 2520/16; B60W 2520/226; B60W 2520/26; B60W 2520/28; B60W 2540/10; B60W 2540/12; B60W 2540/18; B60W 2710/083; B60W 2720/14; B60W 2720/26; B60W 2720/28; B60W 40/114; B60W 2050/0022; Y02T 10/72; B60Y 2400/804
USPC ............................................. 701/71, 72, 82
See application file for complete search history.

(56) References Cited

U.S. PATENT DOCUMENTS 8,672,790 B2    3/2014   Severinsson et al.

FOREIGN PATENT DOCUMENTS

| JP | 2007-232197 A | 9/2007 | |
|---|---|---|---|
| JP | WO 2007064 | * 5/2009 | ............... B60L 9/18 |
| JP | 4348783 | * 10/2009 | ............... B60L 9/18 |
| KR | 10-2011-0062124 A | 6/2011 | |
| KR | 10-1449162 B | 10/2014 | |
| KR | 10-1547575 B | 8/2015 | |

(Continued)

*Primary Examiner* — Hai H Huynh
(74) *Attorney, Agent, or Firm* — Morgan, Lewis & Bockius LLP

(57) ABSTRACT

A torque vectoring control device and a method therefor may include a torque vectoring electric device (TVED) that adjusts a ratio of torques distributed to a left wheel and a right wheel using a torque of a torque vectoring control motor (TVCM), and a controller that determines the torque of the TVCM to reduce a difference between speeds of the left wheel and the right wheel when a wheel slip occurs while a vehicle is moving straight, and determines the torque of the TVCM according to handling information of a driver when the vehicle is turning.

18 Claims, 11 Drawing Sheets

(56) References Cited

FOREIGN PATENT DOCUMENTS

| | | | |
|---|---|---|---|
| KR | 10-2145106 B | 8/2020 | |
| WO | WO 2012043683 | * 4/2012 | ............ B60W 30/02 |

* cited by examiner

TORQUE VECTORING CONTROL DEVICE AND METHOD THEREFOR

CROSS-REFERENCE TO RELATED APPLICATION

The present application claims priority to Korean Patent Application No. 10-2022-0030191, filed on Mar. 10, 2022, the entire contents of which is incorporated herein for all purposes by this reference.

BACKGROUND OF THE PRESENT DISCLOSURE

Field of the Present Disclosure

The present disclosure relates to a technology of controlling a torque vectoring electric device (TVED) provided in a vehicle.

Description of Related Art

In general, torque vectoring electric devices (TVEDs) are devices for independently and freely adjusting the magnitude of torque transmitted to left and right wheels to improve movement performance and handling performance of a vehicle.

Here, torque vectoring means a technology of expressing both the magnitude and direction of an output or a driving force of an engine, which is transmitted to the vehicle to the wheels, and changing the magnitude and direction of the torque transmitted to the wheels, particularly, the torque transmitted to both wheels on the same axle line thereamong. That is, the torque vectoring is to change the magnitude and direction of the torque transmitted to both wheels, and is applied as an additional function to a differential in which a ratio of torques distributed to the left and right wheels changes according to loads applied to the wheels.

The TVED for the present function adjusts the ratio of the torque distributed to the left and right wheels by actively controlling a function of the differential by reflecting a traveling intention of a driver. Accordingly, the driver may more actively utilize the driving force and expect improvement in handling characteristics.

However, a function of transmitting an appropriate level of the torque to the required wheels as much as needed according to a required situation while a basic function of the differential is maintained without change should be added to the TVED, and thus it is not easy to implement the TVED.

In recent years, R&D of the TVED has been actively conducted as a technology of electric vehicles (EVs), which may implement the torque vectoring more accurately according to arrangement and control of a motor than a driving system using an internal combustion engine. As performance of environmental vehicles becomes greater, R&D of an element technology which is applied to a rear differential of an all wheel drive (AWD) such as the EVs and is for improving turning performance of the high-performance environmental vehicles has been actively conducted.

In the case of these environmental vehicles, unlike a general internal combustion engine vehicle, mechanical elements such as transfer shafts are not required. In the case of a two-motor e-AWD and the EVs, the torque vectoring may be implemented only by applying a motor control technology. However, in the case of an one-motor e-AWD, development of various torque vectoring technologies is required to implement improvement of the turning performance by optimized rear wheel power distribution.

Accordingly, development of the TVED which is applied to the high-performance environmental vehicle such as the one-motor e-AWD, minimizes power loss to improve fuel efficiency, and improves turning traveling performance has been conducted, but a technology capable of appropriately controlling the TVED according to a driving situation of the vehicle should be developed together.

The information disclosed in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a torque vectoring control device which determines a torque of a torque vectoring control motor (TVCM) to reduce a difference between speeds of a left wheel and a right wheel when a wheel slip occurs while a vehicle is moving straight, determines the torque of the TVCM according to handling information of a driver when the vehicle is turning, thus may stably perform traction control of the vehicle, and may improve turning stability of the vehicle; and a method therefor.

The purposes of the present disclosure may not be limited to the purposes described above, and other purposes and advantages of the present disclosure that are not described may be understood by the following description and may be more clearly understood by embodiments of the present disclosure. Furthermore, it may be easily identified that the purposes and advantages of the present disclosure may be implemented by units and combinations thereof described in the appended claims.

According to an aspect of the present disclosure, there is provided a torque vectoring control device including a torque vectoring electric device (TVED) that adjusts a ratio of torques distributed to a left wheel and a right wheel using a torque of a torque vectoring control motor (TVCM), and a controller that determines the torque of the TVCM to reduce a difference between speeds of the left wheel and the right wheel when a wheel slip occurs while a vehicle is moving straight, and determines the torque of the TVCM according to handling information of a driver when the vehicle is turning.

In an exemplary embodiment of the present disclosure, the handling information of the driver may include at least one of a steering angle, a steering angular speed, an accelerator position sensor (APS) value, and a brake position sensor (BPS) value.

In an exemplary embodiment of the present disclosure, the controller may be configured to determine a first torque according to the steering angle and the steering angular speed, detect a gain corresponding to the APS value and the BPS value, and determine the torque of the TVCM according to the first torque and the gain while the vehicle is turning.

In an exemplary embodiment of the present disclosure, the controller may be provided with a map in which a gain corresponding to a torque of a driving motor of the vehicle is recorded and detect the gain from the map.

In an exemplary embodiment of the present disclosure, the controller may be configured to determine a first torque according to the steering angle and the steering angular speed, determine a second torque according to a difference between a target yaw rate and a sensing yaw rate, detect a gain corresponding to the APS value and the BPS value, determine a third torque by summing the first torque and the second torque, and determine the torque of the TVCM according to the third torque and the gain, when the vehicle is turning.

In an exemplary embodiment of the present disclosure, the controller may determine, as the torque of the TVCM, a result obtained by multiplying the third torque by the gain.

In an exemplary embodiment of the present disclosure, the controller may be configured to determine a first torque according to the steering angle and the steering angular speed, determine a second torque according to a difference between a target yaw rate and a sensing yaw rate, detect a gain corresponding to the APS value and the BPS value, determine a third torque by summing the first torque and the second torque, determine a fourth torque for reducing the difference between the speeds of the left wheel and the right wheel, and determine the torque of the TVCM according to the third torque and the fourth torque, when the vehicle is turning.

In an exemplary embodiment of the present disclosure, the controller may determine, as the torque of the TVCM, a result obtained by summing the third torque and the fourth torque.

In an exemplary embodiment of the present disclosure, the controller may detect a wheel slip according to the difference between the speeds of the left wheel and the right wheel while the vehicle is moving straight and determine the torque of the TVCM such that the TVED performs traction control when the difference between the speeds of the left wheel and the right wheel exceeds a threshold.

According to another aspect of the present disclosure, there is provided a torque vectoring control method of controlling a torque vectoring electric device (TVED) that adjusts a ratio of torques distributed to a left wheel and a right wheel using a torque of a torque vectoring control motor (TVCM), the method including determining the torque of the TVCM to reduce a difference between speeds of the left wheel and the right wheel when a wheel slip occurs while a vehicle is moving straight, and determining the torque of the TVCM according to handling information of a driver when the vehicle is turning.

In an exemplary embodiment of the present disclosure, the determining of the torque of the TVCM when the vehicle is turning may include determining a first torque according to the steering angle and the steering angular speed, detecting a gain corresponding to the APS value and the BPS value, and determining the torque of the TVCM based on the first torque and the gain.

In an exemplary embodiment of the present disclosure, the detecting of the gain may include providing a map in which a gain corresponding to a torque of a driving motor of the vehicle is recorded, and detecting the gain from the map.

In an exemplary embodiment of the present disclosure, the determining of the torque of the TVCM when the vehicle is turning may include determining a first torque according to the steering angle and the steering angular speed, determining a second torque according to a difference between a target yaw rate and a sensing yaw rate, detecting a gain corresponding to the APS value and the BPS value, determining a third torque by summing the first torque and the second torque, and determining the torque of the TVCM according to the third torque and the gain.

In an exemplary embodiment of the present disclosure, the determining of the torque of the TVCM may include determining, as the torque of the TVCM, a result obtained by multiplying the gain by the third torque.

In an exemplary embodiment of the present disclosure, the determining of the torque of the TVCM when the vehicle is turning may include determining a first torque according to the steering angle and the steering angular speed, determining a second torque according to a difference between a target yaw rate and a sensing yaw rate, detecting a gain corresponding to the APS value and the BPS value, determining a third torque by summing the first torque and the second torque, determining a fourth torque for reducing the difference between the speeds of the left wheel and the right wheel, and determining the torque of the TVCM according to the third torque and the fourth torque.

In an exemplary embodiment of the present disclosure, the determining of the torque of the TVCM may include determining, as the torque of the TVCM, a result obtained by summing the third torque and the fourth torque.

In an exemplary embodiment of the present disclosure, the determining of the torque of the TVCM while the vehicle is moving straight may include detecting a wheel slip according to the difference between the speeds of the left wheel and the right wheel while the vehicle is moving straight, and determining the torque of the TVCM so that the TVED performs traction control when the difference between the speeds of the left wheel and the right wheel exceeds a threshold.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
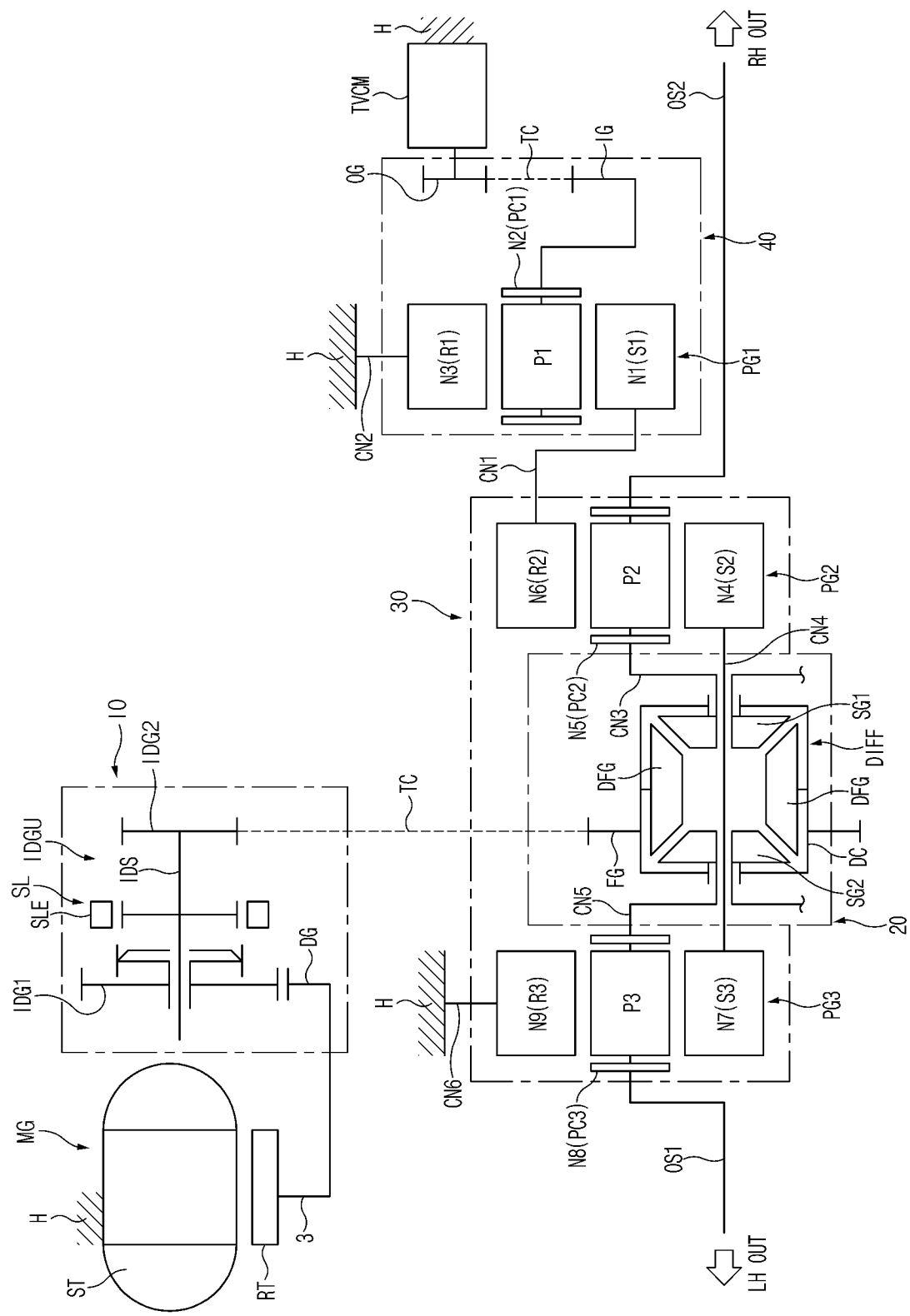
FIG. 1 is a diagram of a torque vectoring electric device (TVED) used in an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present disclosure, a detailed description of the related known configuration or function will be omitted when it is determined that it interferes with the understanding of the exemplary embodiment of the present disclosure.

In describing the components of the exemplary embodiment of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

FIG. 1 is a diagram of a torque vectoring electric device (TVED) used in an exemplary embodiment of the present disclosure, and the TVED may include any structure as long as a torque vectoring control motor (TVCM) is provided.

As illustrated in FIG. 1, the TVED according to an exemplary embodiment of the present disclosure includes a reduction mechanism 10 provided on a line of left and right output shafts OS1 and OS2 together with a motor-generator MG as a driving source, a differential mechanism 20, the TVCM, a torque vectoring mechanism 30, and a torque multiplication mechanism 40.

This TVED reduces rotational power of the motor-generator MG at the reduction mechanism 10 to transmit the reduced rotational power to the differential mechanism 20, and the differential mechanism 20 transmits the rotational power transmitted from the reduction mechanism 10 to left and right wheels while absorbing a difference between the numbers of rotations of the left and right wheels. In the instant case, the torque vectoring mechanism 30 may improve driving performance such as turning traveling performance by adjusting a ratio of torques distributed to the left and right wheels using the torque of the TVCM transmitted from the torque multiplication mechanism 40 according to driving conditions such as turning traveling. The left and right output shafts OS1 and OS2 may mean power transmission shafts configured between the differential mechanism 20 and the left and right wheels and generally mean left and right driveshafts.

The motor-generator MG includes a stator ST fixed to one side of a housing "H" and a rotor RT power-connected to the reduction mechanism 10 and may simultaneously perform a function of a motor for supplying the rotational power to the reduction mechanism 10 through the rotor RT and a function of a generator for generating electricity while rotating by a rotation force transmitted from the left and right wheels.

The reduction mechanism 10 reduces the rotational power transmitted from the motor-generator MG to transmit the reduced rotational power to the differential mechanism 20. The reduction mechanism 10 includes a driving gear DG and an idle gear unit IDGU. That is, the rotational power of the motor-generator MG transmitted through the driving gear DG is reduced by the idle gear unit IDGU and is transmitted to the differential mechanism 20. The driving gear DG is fixedly connected to the rotor RT of the motor-generator MG through a hub 3.

The idle gear unit IDGU reduces the rotational power of the motor-generator MG through two idle gears IDG1 and IDG2 having different gear ratios and configured on an idle shaft IDS so that power may be transmitted between the driving gear DG and the differential mechanism 20 and transmits the reduced rotational power to the differential mechanism 20. That is, the idle shaft IDS is provided on an external peripheral side of the differential mechanism 20 in parallel to the left and right output shafts OS1 and OS2.

The two idle gears configured on the idle shaft IDS include the idle input gear IDG1 and the idle output gear IDG2. The idle input gear IDG1 is rotatably provided on the idle shaft IDS and is connected to the driving gear DG as an external gear. The idle output gear IDG2 is fixedly connected to the idle shaft IDS and is power-connected to the differential mechanism 20.

In the instant case, the idle gear unit IDGU configures a synchronizer SL on the idle shaft IDS to selectively synchronously connect the idle input gear IDG1 to the idle shaft IDS to connect or disconnect the rotational power of the motor-generator MG transmitted to the differential mechanism 20. That is, the synchronizer SL is configured between the idle input gear IDG1 and the idle shaft IDS to selectively synchronously connect the idle input gear IDG1 to the idle shaft IDS in a state in which the idle input gear IDG1 is rotatably provided in the idle shaft IDS. Here, the synchronizer SL is a well-known configuration, and thus a detailed description thereof will be omitted. A sleeve SLE applied to the synchronizer SL is provided with a separate actuator as well known, and the actuator may be controlled by a controller.

The TVCM is fixed to one side of the housing H and includes a motor of which the number of rotations and a rotation direction may be controlled, and an output gear OG is configured on a motor shaft to output the torque.

The torque vectoring mechanism 30 is a mechanism for adjusting the ratio of torques distributed to the left and right wheels by use of the torque output from the TVCM and is configured as a combination of two planetary gear sets PG2 and PG3. The two planetary gear sets PG2 and PG3 include second and third planetary gear sets PG2 and PG3 spaced a predetermined distance from each other with the differential mechanism 20 interposed therebeween.

The second planetary gear set PG2 is a single pinion planetary gear set including fourth, fifth and sixth rotation elements N4, N5, and N6, and includes a second sun gear S2 as the fourth rotation element N4, a second planet carrier PC2 as the fifth rotation element N5, which rotatably supports a plurality of second pinion gears P2 provided on an external peripheral side of the second sun gear S2 at equal radial intervals and circumscribed and engaged with the external peripheral side of the second sun gear S2 so that the second pinion gears P2 may rotate and revolve, and a second ring gear R2 as the sixth rotation element N6, which is inscribed and engaged with the plurality of second pinion gears P2 and is power-connected to the second sun gear S2.

The third planetary gear set PG3 is a single pinion planetary gear set including seventh, eighth, and ninth rotation elements N7, N8, and N9, and includes a third sun gear S3 as the seventh rotation element N7, a third planet carrier PC3 as the eighth rotation element N8, which rotatably supports a plurality of third pinion gears P3 provided on an external peripheral side of the third sun gear S3 at equal radial intervals and circumscribed and engaged with the external peripheral side of the third sun gear S3 so that the third pinion gears P3 may rotate and revolve, and a third ring gear R3 as the ninth rotation element N9, which is inscribed and engaged with the plurality of third pinion gears P3 and is power-connected to the third sun gear S3.

Here, the fourth rotation element N4 is fixedly connected to the seventh rotation element N7 through a fourth connection member CN4, the fifth rotation element N5 is fixedly connected to the right output shaft OS2 through a third connection member CN3, the sixth rotation element N6 is connected to the torque multiplication mechanism 40 through a first connection member CN1, and thus the fourth rotation element N4, the fifth rotation element N5, and the sixth rotation element N6 receive the torque of the TVCM.

Furthermore, the eighth rotation element N8 is fixedly connected to the left output shaft OS1 through the fifth connection member CN5, the ninth rotation element N9 is fixedly connected to the housing H through a sixth connection member CN6, and thus the eighth rotation element N8 and the ninth rotation element N9 operate as always fixed elements.

Meanwhile, the fourth connection member CN4 fixedly connected to the fourth rotation element N4 and the seventh rotation element N7 may be provided in parallel to a line of the left and right output shafts OS1 and OS2, and the second planetary gear set and the third planetary gear set PG2 and PG3 may be designed to have the same gear ratio.

The differential mechanism 20 transmits the rotational power transmitted from the reduction mechanism 10 to the left and right output shafts OS1 and OS2 while absorbing the difference between the numbers of rotations of the left and right wheels.

The differential mechanism 20 is configured as a differential DIFF in which a differential case DC that receives the rotational power from the reduction mechanism 10 through a final gear FG is provided between the second planetary gear set and the third planetary gear set PG2 and PG3 of the torque vectoring mechanism 30. That is, in the differential DIFF, the differential case DC is provided between the second planetary gear set and the third planetary gear set PG2 and PG3 and is rotatably provided in the fourth connection member CN4 fixing and connecting the fourth rotation element N4 and the seventh rotation element N7.

A plurality of differential gears DFG are rotatably provided on an internal circumferential surface in the rotation direction inside the differential case DC, and first and second side gears SG1 and SG2 are rotatably provided on the fourth connection member CN4 on both internal sides of the differential case DC and are engaged with the plurality of differential gears DFG.

Here, the first side gear SG1 is fixedly connected to the fifth rotation element N5 of the torque vectoring mechanism 30 through the third connection member CN3 and is power-connected to the right output shaft OS2, and the second side gear SG2 is fixedly connected to the eighth rotation element N8 of the torque vectoring mechanism 30 through the fifth connection member CN5 and is power-connected to the left output shaft OS1.

Furthermore, the final gear FG is formed on an external peripheral surface of the differential case DC in the rotation direction and is power-connected to the reduction mechanism 10 through a power connection member TC. The differential DIFF 15 rotatably provided on the fourth connection member CN4 fixing and connecting the fourth rotation element N4 and the seventh rotation element N7 of the second planetary gear set and the third planetary gear set PG2 and PG3, and the first and second side gears SG1 and SG2 inside the differential case DC transmit the rotational power to the output shafts OS1 and OS2 through the fifth and eighth rotation elements N5 and N8 of the second planetary gear set and the third planetary gear set PG2 and PG3 while absorbing the difference between the numbers of rotations of the left and right wheels. The power connection member TC may be formed of a chain and may be formed of a belt such as a metal belt or a pulley belt.

Meanwhile, the torque multiplication mechanism 40 includes a first planetary gear set PG1 provided on the right output shaft OS2 between the torque vectoring mechanism 30 and the TVCM.

The first planetary gear set PG1 is a single pinion planetary gear set including first, second, and third rotation elements N1, N2, and N3, and includes a first sun gear S1 as the first rotation element N1, a first planet carrier PC1 as the second rotation element N2, which rotatably supports a plurality of first pinion gears P1 provided on an external peripheral side of the first sun gear S1 at equal radial intervals and circumscribed and engaged with the external peripheral side of the first sun gear S1 so that the first pinion gears P1 may rotate and revolve, and a first ring gear R1 as the third rotation element N3, which is inscribed and engaged with the plurality of first pinion gears P1 and is power-connected to the first sun gear S1.

Here, the first rotation element N1 is fixedly connected to the sixth rotation element N6 of the torque vectoring mechanism 30 through the first connection member CN1, the second rotation element N2 is power-coupled to the TVCM, the third rotation element N3 is fixedly connected to the housing H through a second connection member CN2, and thus the first rotation element N1, the second rotation element N2, and the third rotation element N3 operate as always fixed elements.

The torque multiplication mechanism 40 multiplies the torque transmitted from the TVCM through the second rotation element N2 and transmits the multiplied torque to the sixth rotation element N6 of the torque vectoring mechanism 30 through the first rotation element N1. That is, an input gear IG is fixedly connected to one side of the second rotation element N2, and the input gear IG is power-connected through the power connection member TC connected to the output gear OG of the TVCM on the motor shaft.

Furthermore, the six connection members CN1 to CN6 may be rotation members that fixedly connect a plurality of rotation elements among the rotation elements of the planetary gear sets PG1, PG2, and PG3 and transmit the power while rotating together with the rotation elements, may be rotation members that selectively connect the rotation element to the housing H, or may be fixing members that directly connect and fix the rotation elements to the housing H.

Furthermore, in the above description, terms "fixedly connected" or terms similar thereto mean that the plurality of rotation elements connected to each other through the connection members including the left and right output shafts OS1 and OS2 and the connection members are connected to rotate without the difference between the numbers of rotations. That is, the plurality of rotation elements and the connection members fixedly connected to each other rotate in the same rotation direction and at the same number of rotations.

The torque vectoring mechanism 30 including the present configuration performs torque vectoring that distributes the torque to the left and right wheels based on the torque of the TVCM multiplied by the torque multiplication mechanism 40.

Figure 2:
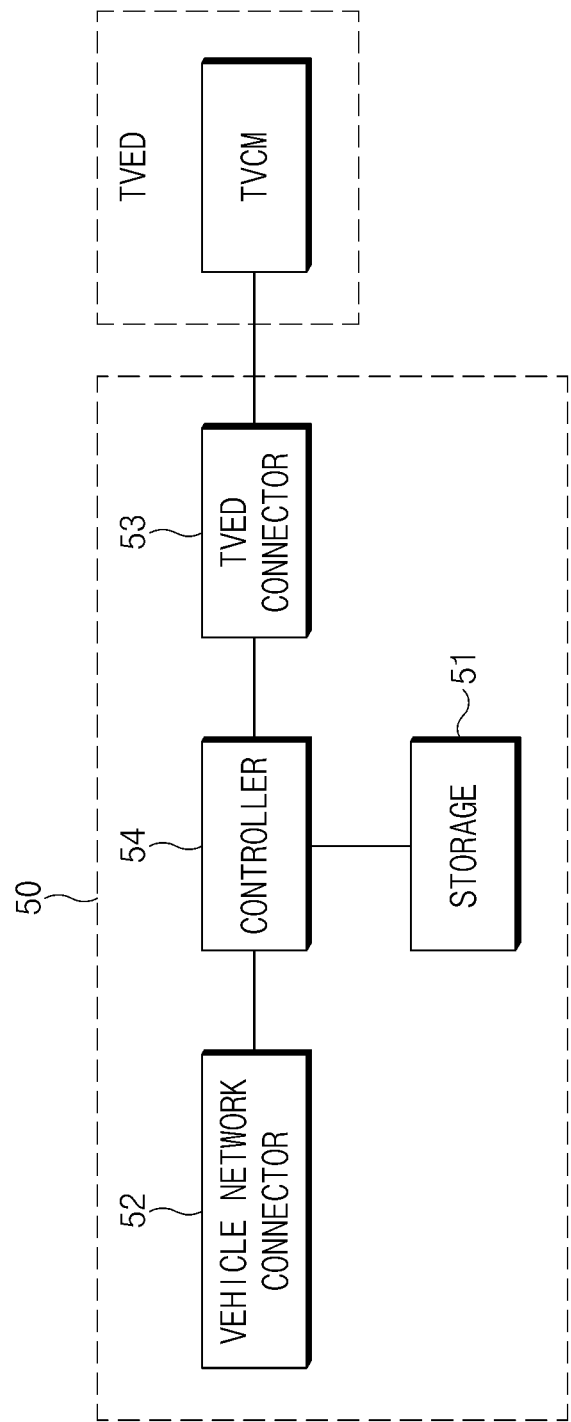
FIG. 2 is a diagram of a torque vectoring control device according to an exemplary embodiment of the present disclosure.

FIG. 2 is a diagram of a torque vectoring control device according to an exemplary embodiment of the present disclosure.

As illustrated in FIG. 2, a torque vectoring control device 50 according to an exemplary embodiment of the present disclosure may include storage 51, a vehicle network connector 52, a TVED connector 53, and a controller 54. In the instant case, according to a method of implementing the torque vectoring control device 50 according to an exemplary embodiment of the present disclosure, respective components may be combined with each other to be implemented as one component or some components may be omitted.

In the description of the respective components, first, the storage 51 may store various logics, algorithms, and programs required in a process of determining a torque of the TVCM for reducing a difference between speeds of the left and right wheels when wheel slip occurs while a vehicle is moving straight.

The storage 51 may store various logics, algorithms, and programs required in a process of determining the torque of the TVCM according to handling information of a driver when the vehicle turns. Here, the handling information of the driver may include a steering angle, a steering angular speed, an accelerator position sensor (APS) value, a brake position sensor (BPS) value, and the like. Here, the APS value is a value indicating a degree by which the driver steps on an accelerator pedal, and the BPS value is a value indicating a degree by which the driver steps on a brake pedal.

The storage 51 may store a generally well-known vehicle speed gain map.

The storage 51 may include at least one of storage medium among a flash memory, a hard disk type memory, a micro type memory, a card type memory (for example, a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The vehicle network connector 52 is a module that provides a connection interface with a vehicle network, and the controller 54 may collect various pieces of information (or data) from the vehicle network through the vehicle network connector 52. In the instant case, the vehicle network may include a controller area network (CAN), a local interconnect network (LIN), a FlexRay, a media oriented systems transport (MOST), an Ethernet, and the like. Furthermore, the various pieces of information may include, for example, left and right speeds (wheel speeds) of a driving wheel, a steering angle, a steering angular speed, a yaw rate, a longitudinal acceleration, a transverse acceleration, a tire air pressure, an APS value, a BPS value, a torque of a driving motor MG, and the like. In the instant case, the driving wheel may mean a wheel rotated by a driving force of the driving motor MG.

The TVED connector 53 is a module that provides a connection interface with the TVED and may transmit the torque determined by the controller 54 to the TVCM in the TVED.

The controller 54 may perform overall control so that the respective components may normally perform functions thereof. The controller 54 may be implemented in a form of hardware, may be implemented in a form of software, or may be implemented in the form in which the hardware and the software are combined. The controller 54 may be implemented as a microprocessor, but the present disclosure is not limited thereto.

The controller 54 may perform various controls in a process of determining the torque of the TVCM for reducing the difference between the speeds of the left and right wheels when wheel slip occurs while the vehicle is moving straight.

Furthermore, the controller 54 may perform various controls in a process of determining the torque of the TVCM based on the handling information of the driver when the vehicle turns.

Hereinafter, an operation of the controller 54 will be described with reference to FIGS. 3 to 7.

Figure 3:
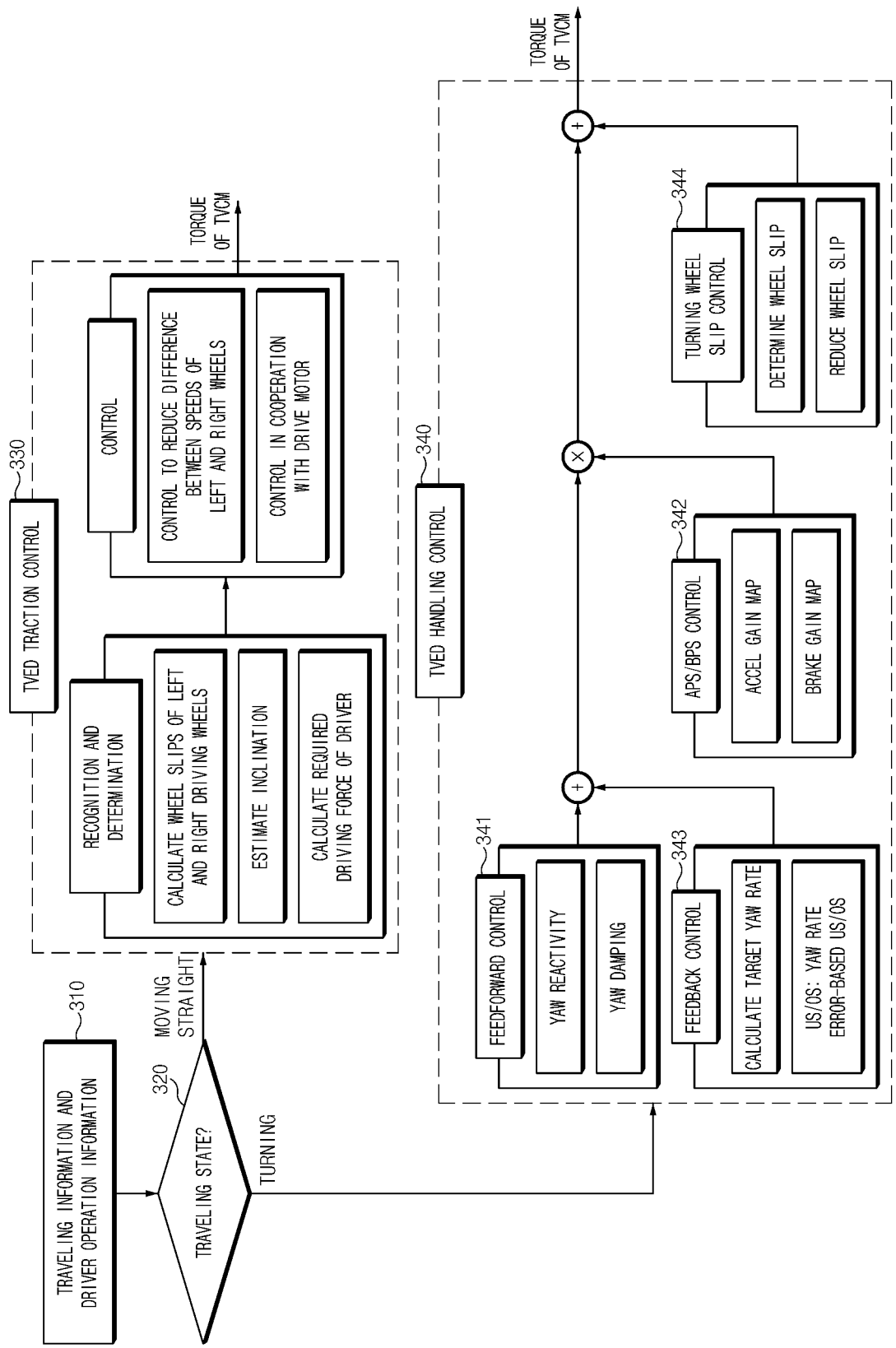
FIG. 3 is an exemplary view exemplarily illustrating an overall operation of a controller provided in the torque vectoring control device according to an exemplary embodiment of the present disclosure.

FIG. 3 is an exemplary view exemplarily illustrating an overall operation of a controller provided in the torque vectoring control device according to an exemplary embodiment of the present disclosure.

As illustrated in FIG. 3, first, the controller 54 may determine whether a traveling state of the vehicle is straight traveling or turning traveling based on traveling information collected from the vehicle network through the vehicle network connector 52 and the handling (operation) information of the driver (310, 320). In the instant case, the traveling information may include left and right speeds (wheel speeds) of the driving wheel, a yaw rate, a longitudinal acceleration, a transverse acceleration, a tire air pressure, a torque of the driving motor MG, and the like. The traveling information may be used when the controller 54 performs traction control or handling control.

When the vehicle is moving straight, the controller 54 may perform the traction control (330). That is, the controller 54 may detect wheel slip based on a left wheel speed and a right wheel speed, estimate an inclination of a road on which the vehicle travels, and determine a required driving force of the driver. Thereafter, the controller 54 may determine the torque of the TVCM for reducing the difference between the speeds of the left and right wheels based on at least one of the inclination of the road and the required driving force of the driver. The torque of the TVCM, which is determined in the present way, is transmitted to the TVED to reduce the difference between the speeds of the left and right wheels. Here, the controller 54 together with a motor control unit (MCU) provided in the vehicle may perform cooperative control to reduce the torque of the driving motor MG.

When the vehicle turns, the controller 54 may perform the handling control (340). As various exemplary embodiments of the present disclosure, the controller 54 may determine a first torque in consideration of yaw reactivity and yaw damping of the vehicle (341), detect a gain corresponding to the APS value and the BPS value (342), and determine the torque of the TVCM based on the first torque and the gain. Here, the controller 54 may determine the torque of the TVCM by multiplying the gain by the first torque.

As various exemplary embodiments of the present disclosure, the controller 54 may determine a target yaw rate and determine a second torque in consideration of a difference (hereinafter, referred to as a yaw rate error) between the target yaw rate and a detected yaw rate (343). Thereafter, the controller 54 may sum the first torque and the second torque, determine a third torque by applying a gain corresponding to the APS value and the BPS value to the summed result, and determine the third torque as the torque of the TVCM. Here, the controller 54 may determine the torque of the TVCM by multiplying the gain by the result obtained by summing the first torque and the second torque.

As various exemplary embodiments of the present disclosure, the controller 54 may detect the wheel slip based on the speeds of the left and right wheels and determine a fourth torque for reducing the difference between the speeds of the left and right wheels (344). Thereafter, the controller 54 may determine, as the torque of the TVCM, a result of summing the third torque determined in the various exemplary embodiments or the third torque determined in the various exemplary embodiments and the fourth torque.

Figure 4:
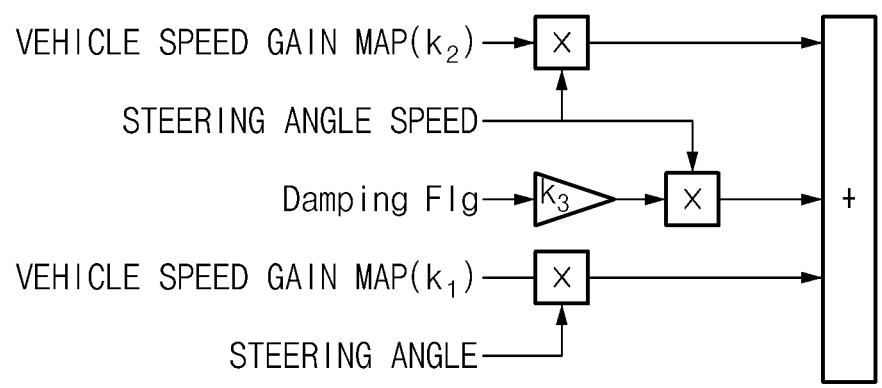
FIG. 4 is a first exemplary view exemplarily illustrating a detailed operation of the controller provided in the torque vectoring control device according to an exemplary embodiment of the present disclosure.

FIG. 4 is a first exemplary view exemplarily illustrating a detailed operation of the controller provided in the torque vectoring control device according to an exemplary embodiment of the present disclosure, and illustrates a process of determining the first torque.

The controller 54 may determine a first result value by multiplying a gain k1 on the vehicle speed gain map by the steering angle, determine a second result value by multiplying a gain k2 on the vehicle speed gain map by the steering angular speed, determine a third result value by multiplying a gain k3 on a damping flag by the steering angular speed, and determine, as the first torque, the sum of the first result value, the second result value, and the third result value. That is, the controller 54 may determine the first torque based on [Equation 1].

$$F_{FF\_Ctrl} = k_1 \cdot \delta + k_2 \cdot \dot{\delta} + k_3 \cdot \dot{\delta} \quad \text{[Equation 1]}$$

Here, $k_1$, $k_2$, and $k_3$ denote constants as gains, $\delta$ denotes a steering angle, and $\dot{\delta}$ denotes a steering angular speed. In the instant case, when a product of the steering angle and the steering angular speed is equal to or greater than zero, $k_3$ is 1, and when the product of the steering angle and the steering angular speed is less than zero, $k_3$ is greater than 1.

Figure 5:
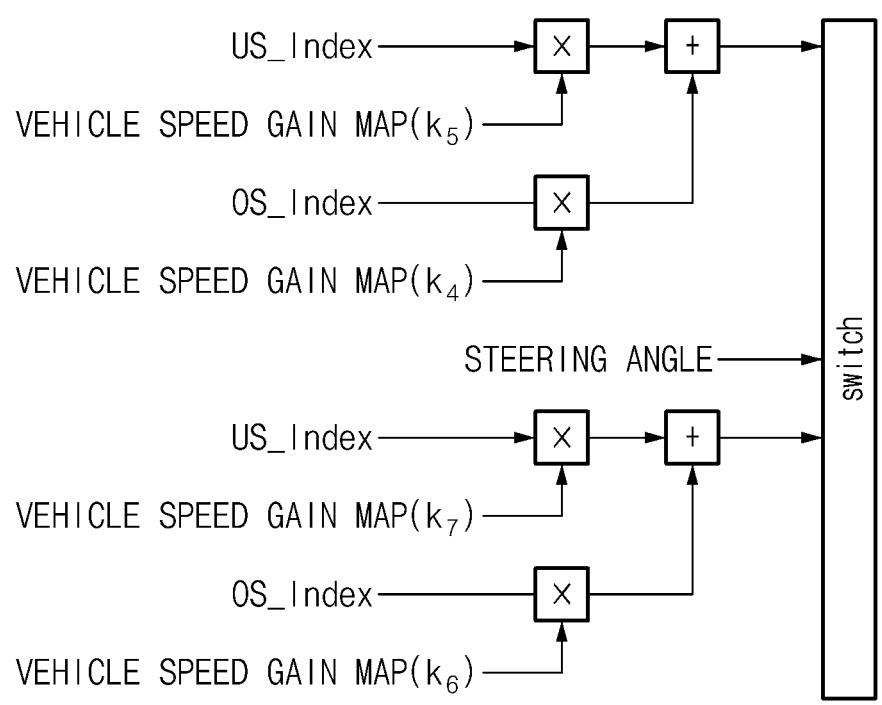
FIG. 5 is a second exemplary view exemplarily illustrating a detailed operation of the controller provided in the torque vectoring control device according to an exemplary embodiment of the present disclosure.

FIG. 5 is a second exemplary view exemplarily illustrating a detailed operation of the controller provided in the torque vectoring control device according to an exemplary embodiment of the present disclosure, and illustrates a process of determining the second torque.

The controller 54 may generate an understeer index or an oversteer index based on the yaw rate error and determine the second torque corresponding to the understeer index or the oversteer index. As an exemplary embodiment of the present disclosure, the controller 54 may determine the second torque based on [Equation 2].

$$\dot{\psi}_{error\_jud} = \text{sgn}(\dot{\psi}_{sen}) \cdot (\dot{\psi}_{des} - \dot{\psi}_{sen}) \quad \dot{\psi}_{des} = \frac{v_x \delta}{\eta L \left(1 + \left(\frac{v}{v_c}\right)^2\right)} \quad \text{[Equation 2]}$$

$\dot{\psi}_{error\_jud} > 0$, oversteer $\dot{\psi}_{error\_jud} < 0$, understeer $T_{FB\_Ctrl} = k_4 \times OSIndex + k_5 \times USIndex \ (\delta > 0)$ $T_{FB\_Ctrl} = k_6 \times OSIndex + k_7 \times USIndex \ (\delta < 0)$ Here, $\dot{\psi}_{error\_jud}$ denotes an understeer and oversteer determination condition, $\dot{\psi}_{des}$ denotes a target yaw rate, and $\dot{\psi}_{zen}$ denotes a sensing yaw rate. Furthermore, $v_x$ denotes a vehicle speed, L denotes a wheelbase, $\delta$ denotes a steering angle, and $\eta$ denotes a steering gear ratio. Furthermore, $v_c$ is a characteristic speed and means a speed at which the steering angle required to maintain the turning becomes twice the Ackerman steering angle. For reference, $v_c$ may be obtained by performing a root operation on a value obtained by dividing a product of the gravitational acceleration and a wheel base by a vehicle characteristic factor (constant). $T_{FB\_Ctrl}$ denotes the second torque, and $k_4$, $k_5$, $k_6$, and $k_7$ denote constants as gains on the vehicle speed gain map.

When the steering angle exceeds zero, the controller 54 may determine, as the second torque, a sum of the result obtained by multiplying the oversteer index OSIndex by the $k_4$ and the result obtained by multiplying understeer index USIndex by the $k_5$.

When the steering angle does not exceed zero, the controller 54 may determine, as the second torque, a sum of the result obtained by multiplying the oversteer index OSIndex by the $k_6$ and the result obtained by multiplying understeer index USIndex by the $k_7$.

Meanwhile, when a sensing yaw rate is positive (+) and a result obtained by subtracting the sensing yaw rate from the target yaw rate is positive (+), a determination condition is also positive (+), and thus the controller 54 determines a current state as an oversteer.

When the sensing yaw rate is positive (+) and the result obtained by subtracting the sensing yaw rate from the target yaw rate is negative (−), the determination condition is negative (−), and thus the controller 54 determines the current state as an understeer.

When the sensing yaw rate is negative (−) and the result obtained by subtracting the sensing yaw rate from the target yaw rate is negative (−), the determination condition is positive (+), and thus the controller 54 determines the current state as the oversteer.

When the sensing yaw rate is positive (−) and the result obtained by subtracting the sensing yaw rate from the target yaw rate is positive (+), the determination condition is negative (−), and thus the controller 54 determines the current state as the understeer.

Figure 6:
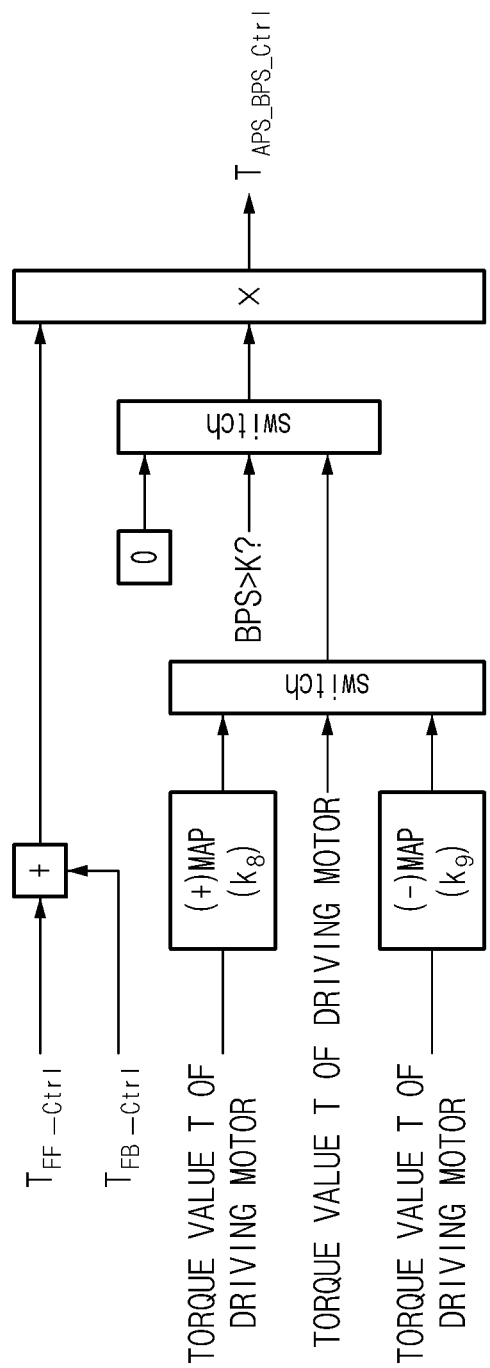
FIG. 6 is a third exemplary view exemplarily illustrating a detailed operation of the controller provided in the torque vectoring control device according to an exemplary embodiment of the present disclosure.

FIG. 6 is a third exemplary view exemplarily illustrating a detailed operation of the controller provided in the torque vectoring control device according to an exemplary embodiment of the present disclosure, and illustrates a process of determining the third torque.

Because the understeer occurs when the driver steps on the accelerator pedal while the vehicle turns at the same steering angle, the controller 54 should increase a torque of a turning external wheel and decrease a torque of a turning internal wheel. Furthermore, because the oversteer occurs when the driver steps on the brake pedal (or when regenerative braking is operated) while the vehicle turns at the same steering angle, the controller 54 should decrease the torque of the turning external wheel and increase the torque of the turning internal wheel.

Thus, the controller 54 may sum the first torque and the second torque, detect a gain corresponding to the APS value and the BPS value, and determine the third torque based on the summed result and the gain. That is, the controller 54 includes a first map (+map) in which a gain corresponding to a torque T of the driving motor is recorded and a second map (−map) in which the gain corresponding to the torque T of the driving motor is recorded, selects the first map to obtain a gain $k_8$ when the torque T of the driving motor is greater than zero, and selects the second map to obtain a gain $k_9$ when the torque T is not greater than zero. In the instant case, the torque T of the driving motor is a value on which the APS value is reflected. Thus, the controller 54 may firstly consider the APS value and then consider the BPS value. That is, the controller 54 may obtain the gain corresponding to the torque T of the driving motor on which the APS value is reflected and may then select one of the obtained gain and zero according to whether the BPS value exceeds a threshold K. Here, the controller 54 may determine the third torque based on [Equation 3].

$$T_{APS\_BPS\_Ctrl}=k_8(t_{FF\_Ctrl}+T_{FB\_Ctrl}),$$
$$T>0 \&\& BPS \leq \text{Threshold}, k_8>1$$

$$T_{APS\_BPS\_Ctrl}=k_9(t_{FF\_Ctrl}+T_{FB\_Ctrl}),$$
$$T\leq 0 \&\& BPS \leq \text{Threshold}, 0<k_9>1$$

$$T_{APS\_BPS\_Ctrl}=0, BPS>\text{Threshold} \quad \text{[Equation 3]}$$

Here, $T_{APS\_BPS\_Ctrl}$ denotes the third torque, $k_8$ and $k_9$ denotes constants as gain, T denotes the torque of the driving motor MG, $T_{FF\_Ctrl}$ denotes the first torque, and $T_{FB\_Ctrl}$ denotes the second torque. In the instant case, the second torque is a value which may be deleted according to the traveling situation.

When the BPS value exceeds the threshold K, the controller 54 may determine the third torque to zero. Furthermore, when the BPS value does not exceed the threshold K, the controller 54 may determine the third torque using the first equation of [Equation 3] when the torque T of the driving motor exceeds zero, and may determine the third torque using the second equation of [Equation 3] when the torque of the driving motor does not exceed zero.

Figure 7:
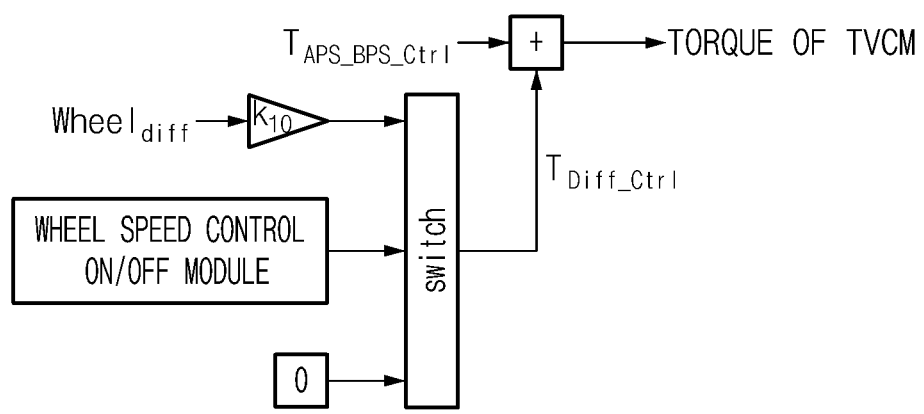
FIG. 7 is a fourth exemplary view exemplarily illustrating a detailed operation of the controller provided in the torque vectoring control device according to an exemplary embodiment of the present disclosure.

FIG. 7 is a fourth exemplary view exemplarily illustrating a detailed operation of the controller provided in the torque vectoring control device according to an exemplary embodiment of the present disclosure, and illustrates a process of determining the fourth torque.

When the vehicle is over-turning, there is a high possibility that slip occurs in a turning internal wheel. This slip may cause the understeer, which may cause loss of the driving force. Thus, when the slip occurs, the controller 54 may transmit the driving force to the turning external wheel, improving movement performance of the vehicle. That is, the controller 54 may determine the slip based on the speeds of the left wheel and the right wheel and determine the fourth torque at which the difference between the speeds of the left wheel and the right wheel may be reduced. As an exemplary embodiment of the present disclosure, the controller 54 may determine the fourth torque using [Equation 4].

$$\text{Wheel}_{diff}=((\text{Wheel}_{RL}+0.5\text{Tread}\cdot\psi_{zen}-(\text{Wheel}_{RR}-0.5\text{Tread}\cdot\psi_{zen}))$$

$$T_{Diff\_Ctrl}=k_{10}\cdot\text{Wheel}_{diff}, \text{Wheel}_{diff}>\text{Threshold} \quad \text{[Equation 4]}$$

Here, $T_{Diff\_Ctrl}$ denotes the fourth torque, $k_{10}$ denotes a constant as a gain, and $\text{Wheel}_{diff}$ denotes the difference between the speeds of the left wheel and the right wheel of a driving wheel. Furthermore, $\text{Wheel}_{RL}$ denotes the speed of the left wheel of the driving wheel, $\text{Wheel}_{RR}$ denotes the speed of the right wheel of the driving wheel, 'Tread' denotes a distance between the left wheel and the right wheel of the driving wheel, '0.5Tread' denotes a half of the distance between the left wheel and the right wheel of the driving wheel, and $\psi_{zen}$ denotes a sensing yaw rate.

The controller 54 may determine that the slit occurs when the difference between the speeds of the left wheel and the right wheel exceeds a threshold, and determine the fourth torque based on [Equation 4].

As a result, the controller 54 may determine a result obtained by summing the third torque and the fourth torque as the torque of the TVCM.

Figure 8:
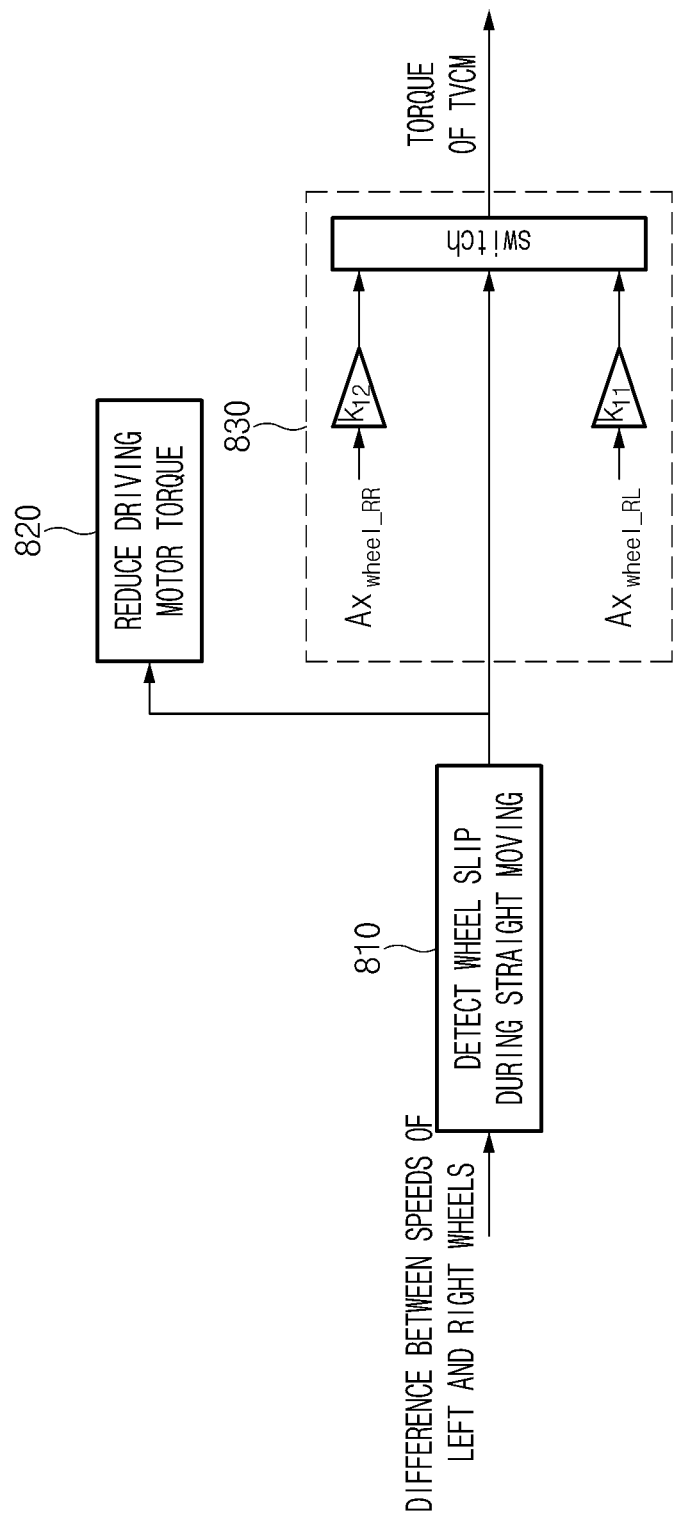
FIG. 8 is a fifth exemplary view exemplarily illustrating a detailed operation of the controller provided in the torque vectoring control device according to an exemplary embodiment of the present disclosure.

FIG. 8 is a fifth exemplary view exemplarily illustrating a detailed operation of the controller provided in the torque vectoring control device according to an exemplary embodiment of the present disclosure, and may be applied while the vehicle is moving straight separately from the first to fourth exemplary views.

First, the controller 54 detects a wheel slip according to the difference between the speeds of the left wheel and the right wheel while the vehicle is moving straight (810). In the instant case, the controller 54 may determine that the wheel slip occurs when the difference between the speeds of the left wheel and the right wheel exceeds the threshold.

Thereafter, the controller 54 reduces the torque of the driving motor through cooperative control together with the MCU (820).

Thereafter, the controller 54 determines the torque of the TVCM for the traction control of the TVED (830). In the instant case, the controller 54 may determine a wheel in which the slip occurs and determine the torque of the TVCM corresponding to the wheel in which the slip occurs. As an exemplary embodiment of the present disclosure, the controller 54 may determine the torque of the TVCM based on [Equation 5].

$$T_{Traction\_Ctrl}=k_{11}(Ax_{wheel\_RL})$$

$$T_{Traction\_Ctrl}=k_{12}(Ax_{wheel\_RR}) \quad \text{[Equation 5]}$$

Here, $T_{Traction\_Ctrl}$ denotes the torque of the TVCM, $k_{11}$ and $k_{12}$ denote constants as gains, $A_{xwheel\_RL}$ denotes an acceleration of the left wheel of the driving wheel, and $A_{xwheel\_RR}$ denotes an acceleration of the right wheel of the driving wheel.

Figure 9:
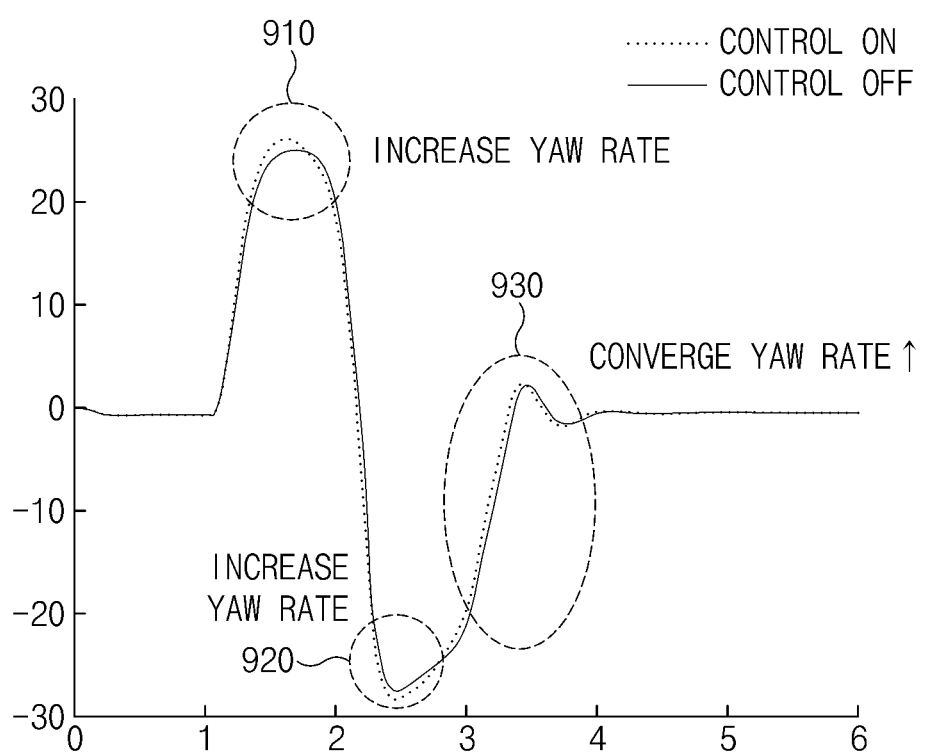
FIG. 9 is an exemplary view exemplarily illustrating performance of the torque vectoring control device according to an exemplary embodiment of the present disclosure.

FIG. 9 is an exemplary view exemplarily illustrating performance of the torque vectoring control device according to an exemplary embodiment of the present disclosure.

As illustrated in FIG. 9, it may be seen that the TVED receiving the torque of the TVCM determined by the torque vectoring control device according to an exemplary embodiment of the present disclosure performs the torque vectoring, and thus the yaw rate primarily increases (910), then secondarily increases (920), and finally converges (930).

Figure 10:
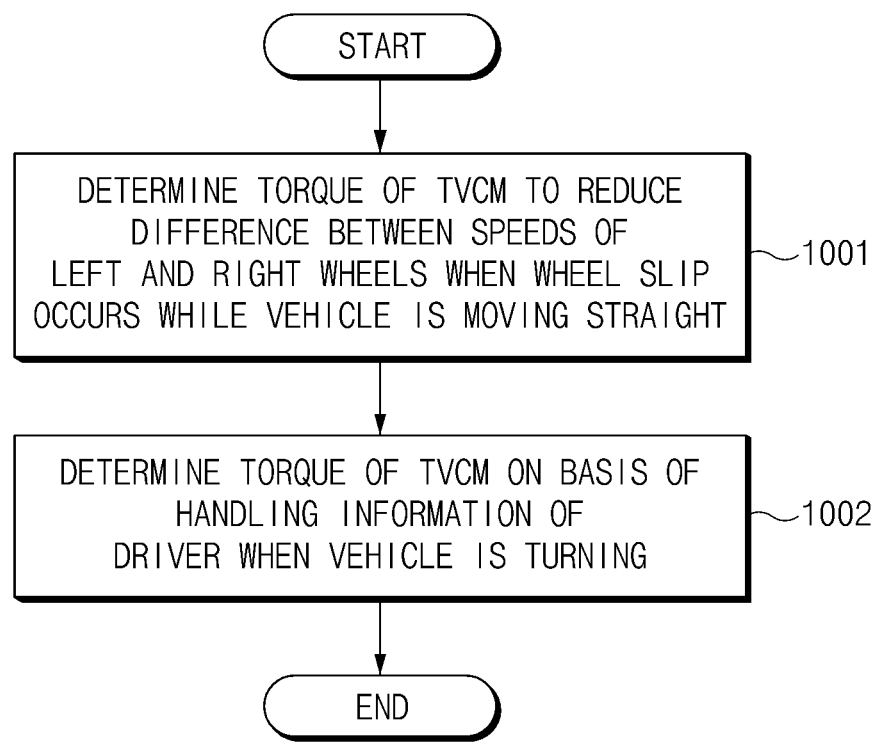
FIG. 10 is a flowchart of a torque vectoring control method according to an exemplary embodiment of the present disclosure.

FIG. 10 is a flowchart of a torque vectoring control method according to an exemplary embodiment of the present disclosure and illustrates a process of controlling the TVED that adjusts the ratio of the torques distributed to the left wheel and the right wheel using the torque of the TVCM.

First, the controller 54 determines the torque of the TVCM so that the difference between the speeds of the left and right wheels is reduced when the wheel slip occurs while the vehicle is moving straight (1001).

Thereafter, the controller 54 determines the torque of the TVCM based on the handling information of the driver when the vehicle is turning (1002).

Figure 11:
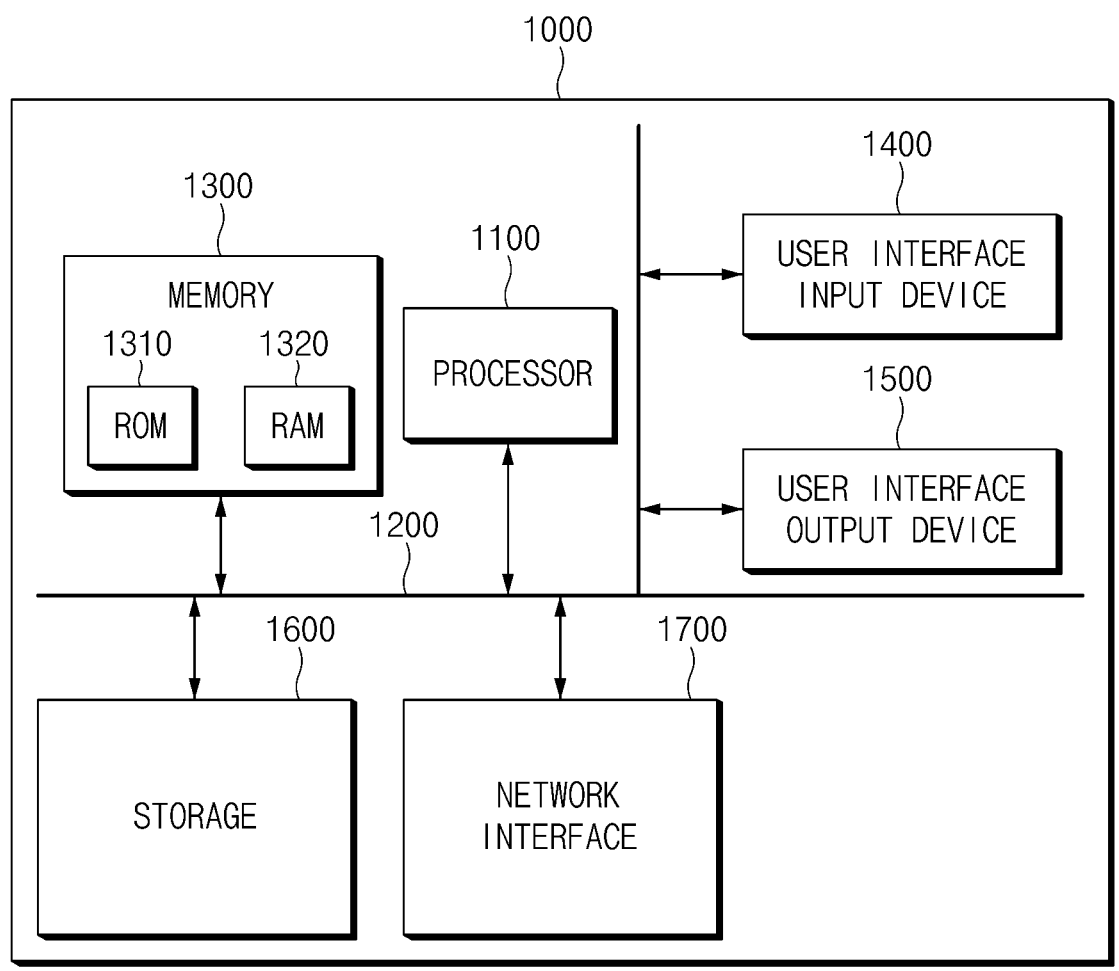
FIG. 11 is a block diagram illustrating a computing system for executing the torque vectoring control method according to an exemplary embodiment of the present disclosure.

FIG. 11 is a block diagram illustrating a computing system for executing the torque vectoring control method according to an exemplary embodiment of the present disclosure.

Referring to FIG. 11, the above-described torque vectoring control method according to an exemplary embodiment of the present disclosure may be implemented even through a computing system. A computing system 1000 may include at least one processor 1100, a memory 1300, a user interface input device 1400, a user interface output device 1500, storage 1600, and a network interface 1700, which are connected through a system bus 1200.

The processor 1100 may be a central processing unit (CPU) or a semiconductor device that processes commands stored in the memory 1300 and/or storage 1600. The memory 1300 and the storage 1600 may include various types of volatile or nonvolatile storage media. For example, the memory 1300 may include a ROM 131 and a RAM 1320.

Thus, operations of a method or algorithm described in connection with the exemplary embodiments included herein may be directly implemented in hardware, a software module, or a combination of the two components, which are executed by the processor 1100. The software module may reside in a storage medium (that is, the memory 1300 and/or the storage 1600) such as a RAM, a flash memory, a ROM, an EPROM, an EEPROM, a register, a hard disk, a solid state drive (SSD), a removable disk, and a compact disk (CD)-ROM. An exemplary storage medium may be coupled to the processor 1100, and the processor 1100 may read information from the storage medium and write information in the storage medium. In another manner, the storage medium may be integrated with the processor 1100. The processor and the storage medium may reside inside an application-predetermined integrated circuit (ASIC). The ASIC may reside inside a user terminal. In yet another manner, the processor and the storage medium may reside as an individual component inside the user terminal.

According to a torque vectoring control device and a method therefor according to an exemplary embodiment of the present disclosure, a torque of a torque vectoring control motor (TVCM) to reduce a difference between speeds of a left wheel and a right wheel when a wheel slip occurs while a vehicle is moving straight is determined, the torque of the TVCM is determined based on handling information of a driver when the vehicle is turning, thus traction control of the vehicle may be stably performed, and turning stability of the vehicle may be improved.

The above description is merely illustrative of the technical spirit of the present disclosure, and those skilled in the art to which the present disclosure belongs may make various modifications and changes without departing from the essential features of the present disclosure.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A torque vectoring control apparatus comprising:
    a torque vectoring electric device (TVED) configured to adjust a ratio of torques distributed to a left wheel and a right wheel of a vehicle using a torque of a torque vectoring control motor (TVCM); and
    a controller configured to determine the torque of the TVCM to reduce a difference between speeds of the left wheel and the right wheel when a wheel slip occurs while the vehicle is moving straight, and to determine the torque of the TVCM according to handling information of a driver when the vehicle is turning.

2. The torque vectoring control apparatus of claim 1, wherein the handling information of the driver includes at least one of a steering angle, a steering angular speed, an accelerator position sensor (APS) value, and a brake position sensor (BPS) value.

3. The torque vectoring control apparatus of claim 2, wherein the controller is configured to determine a first torque according to the steering angle and the steering angular speed, to detect a gain corresponding to the APS value and the BPS value, and to determine the torque of the TVCM according to the first torque and the gain while the vehicle is turning.

4. The torque vectoring control apparatus of claim 3, wherein the controller is provided with a map in which a gain corresponding to a torque of a driving motor of the vehicle is recorded and configured to detect the gain corresponding to the torque from the map.

5. The torque vectoring control apparatus of claim 2, wherein the controller is configured to determine a first torque according to the steering angle and the steering angular speed, to determine a second torque according to a difference between a target yaw rate and a sensing yaw rate, to detect a gain corresponding to the APS value and the BPS value, to determine a third torque by summing the first torque and the second torque, and to determine the torque of the TVCM according to the third torque and the gain, when the vehicle is turning.

6. The torque vectoring control apparatus of claim 5, wherein the controller is configured to determine, as the torque of the TVCM, a result obtained by multiplying the third torque by the gain.

7. The torque vectoring control apparatus of claim 2, wherein the controller is configured to determine a first torque according to the steering angle and the steering angular speed, to determine a second torque according to a difference between a target yaw rate and a sensing yaw rate, to detect a gain corresponding to the APS value and the BPS value, to determine a third torque by summing the first torque and the second torque, to determine a fourth torque for reducing the difference between the speeds of the left wheel and the right wheel, and to determine the torque of the TVCM according to the third torque and the fourth torque, when the vehicle is turning.

8. The torque vectoring control apparatus of claim 7, wherein the controller is configured to determine, as the torque of the TVCM, a result obtained by summing the third torque and the fourth torque.

9. The torque vectoring control apparatus of claim 1, wherein the controller is configured to detect the wheel slip according to the difference between the speeds of the left wheel and the right wheel while the vehicle is moving straight and to determine the torque of the TVCM so that the TVED performs traction control when the difference between the speeds of the left wheel and the right wheel exceeds a threshold.

10. A torque vectoring control method of controlling a torque vectoring electric device (TVED) that adjusts a ratio of torques distributed to a left wheel and a right wheel of a vehicle using a torque of a torque vectoring control motor (TVCM), the method comprising:
   determining, by a controller, the torque of the TVCM to reduce a difference between speeds of the left wheel and the right wheel when a wheel slip occurs while the vehicle is moving straight; and
   determining, by the controller, the torque of the TVCM according to handling information of a driver when the vehicle is turning.

11. The method of claim 10, wherein the handling information of the driver includes at least one of a steering angle, a steering angular speed, an accelerator position sensor (APS) value, and a brake position sensor (BPS) value.

12. The method of claim 11, wherein the determining of the torque of the TVCM when the vehicle is turning includes:
   determining, by the controller, a first torque according to the steering angle and the steering angular speed;
   detecting, by the controller, a gain corresponding to the APS value and the BPS value; and
   determining, by the controller, the torque of the TVCM based on the first torque and the gain.

13. The method of claim 12, wherein the detecting of the gain includes:
   providing, by the controller, a map in which a gain corresponding to a torque of a driving motor of the vehicle is recorded; and
   detecting, by the controller, the gain corresponding to the torque from the map.

14. The method of claim 11, wherein the determining of the torque of the TVCM when the vehicle is turning includes:
   determining, by the controller, a first torque according to the steering angle and the steering angular speed;
   determining, by the controller, a second torque according to a difference between a target yaw rate and a sensing yaw rate;
   detecting, by the controller, a gain corresponding to the APS value and the BPS value;
   determining, by the controller, a third torque by summing the first torque and the second torque; and
   determining, by the controller, the torque of the TVCM according to the third torque and the gain.

15. The method of claim 14, wherein the determining of the torque of the TVCM includes determining, as the torque of the TVCM, a result obtained by multiplying the gain by the third torque.

16. The method of claim 11, wherein the determining of the torque of the TVCM when the vehicle is turning includes:
   determining, by the controller, a first torque according to the steering angle and the steering angular speed;
   determining, by the controller, a second torque according to a difference between a target yaw rate and a sensing yaw rate;
   detecting, by the controller, a gain corresponding to the APS value and the BPS value;
   determining, by the controller, a third torque by summing the first torque and the second torque;
   determining, by the controller, a fourth torque for reducing the difference between the speeds of the left wheel and the right wheel; and
   determining, by the controller, the torque of the TVCM according to the third torque and the fourth torque.

17. The method of claim 16, wherein the determining of the torque of the TVCM includes determining, as the torque of the TVCM, a result obtained by summing the third torque and the fourth torque.

18. The method of claim 10, wherein the determining of the torque of the TVCM while the vehicle is moving straight includes:
   detecting, by the controller, the wheel slip according to the difference between the speeds of the left wheel and the right wheel while the vehicle is moving straight; and
   determining, by the controller, the torque of the TVCM so that the TVED performs traction control when the difference between the speeds of the left wheel and the right wheel exceeds a threshold.

\* \* \* \* \*